(12) United States Patent
Al-Rawi et al.

(10) Patent No.: US 10,627,885 B2
(45) Date of Patent: Apr. 21, 2020

(54) HYBRID PRIORITIZED RESOURCE ALLOCATION IN THERMALLY- OR POWER-CONSTRAINED COMPUTING DEVICES

(71) Applicant: Intel Corporation, Santa Clara, CA (US)

(72) Inventors: Asma Al-Rawi, Hillsboro, OR (US); Federico Ardanaz, Hillsboro, OR (US); Jonathan M. Eastep, Portland, OR (US); Nikhil Gupta, Portland, OR (US); Ankush Varma, Hillsboro, OR (US); Krishnakanth V. Sistla, Beaverton, OR (US); Ian M. Steiner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/866,425

(22) Filed: Jan. 9, 2018

(65) Prior Publication Data
US 2019/0041949 A1    Feb. 7, 2019

(51) Int. Cl.
| G06F 1/26 | (2006.01) |
|---|---|
| G06F 1/32 | (2019.01) |
| G06F 1/3206 | (2019.01) |
| G06F 1/324 | (2019.01) |
| H04L 12/12 | (2006.01) |
| G06F 1/3228 | (2019.01) |
| G06F 1/20 | (2006.01) |

(52) U.S. Cl.
CPC ........... *G06F 1/3206* (2013.01); *G06F 1/206* (2013.01); *G06F 1/324* (2013.01); *G06F 1/3228* (2013.01); *H04L 12/12* (2013.01)

(58) Field of Classification Search
None
See application file for complete search history.

(56) References Cited

U.S. PATENT DOCUMENTS

| 2006/0168571 A1* | 7/2006 | Ghiasi .................... G06F 9/505 717/127 |
| 2008/0209243 A1* | 8/2008 | Ghiasi .................. G06F 1/3203 713/320 |
| 2011/0004575 A1 | 1/2011 | Yang et al. |
| 2011/0154348 A1 | 6/2011 | Elnozahy et al. |
| 2012/0216029 A1 | 8/2012 | Shah et al. |
| 2016/0054780 A1* | 2/2016 | Bodas .................. G06F 1/3203 713/320 |

FOREIGN PATENT DOCUMENTS

WO    2003021502 A2    3/2003

* cited by examiner

*Primary Examiner* — Nitin C Patel
(74) *Attorney, Agent, or Firm* — Patent Capital Group (57) ABSTRACT

Various embodiments comprise prioritizing frequency allocations in thermally- or power-constrained computing devices. Computer elements may be assigned 'weights' based on their priorities. The computer elements with higher weights may receive higher frequency allocations to assure they receive priority in processing more quickly. The computer elements with lower weights may receive lower frequency allocations and suffer a slowdown in their processing. Elements with the same weight may be grouped together for the purpose of frequency allocation.

25 Claims, 4 Drawing Sheets

COMPUTE ELEMENTS

HYBRID PRIORITIZED RESOURCE ALLOCATION IN THERMALLY- OR POWER-CONSTRAINED COMPUTING DEVICES

TECHNICAL FIELD OF THE INVENTION

Various embodiments of the invention relate to controlling power in thermally- or power-constrained computing devices, with an intention of allocating greater power to higher priority components.

BACKGROUND

As transistor density has been increasing, power density has also been increasing. Thermal design and thermal packaging are sometimes designed such that when all components are run at maximum frequency and worst case power conditions, thermal design limits may be exceeded. This has previously been addressed by monitoring temperature and power consumption, and then actuating throttling mechanisms to reduce temperature or power consumption when conditions were approaching or exceeding thermal design limits.

Throttling typically takes the form of reducing frequency, which unfortunately reduces performance as well. However, reducing frequency uniformly runs the risk of applying this power reduction technique throughout the system, even in areas where it is not needed, and thereby reducing the performance of all areas. Past attempts at applying frequency reduction non-uniformly have typically been based on criteria such as the power efficiency of different elements. None of these approaches addresses the goal of keeping the most important functions running at high speed.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented fully or partially in software and/or firmware. This software and/or firmware may take the form of instructions contained in or on a non-transitory computer-readable storage medium. The instructions may be read and executed by one or more processors to enable performance of the operations described herein. The medium may be internal or external to the device containing the processor(s), and may be internal or external to the device performing the operations. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 1:
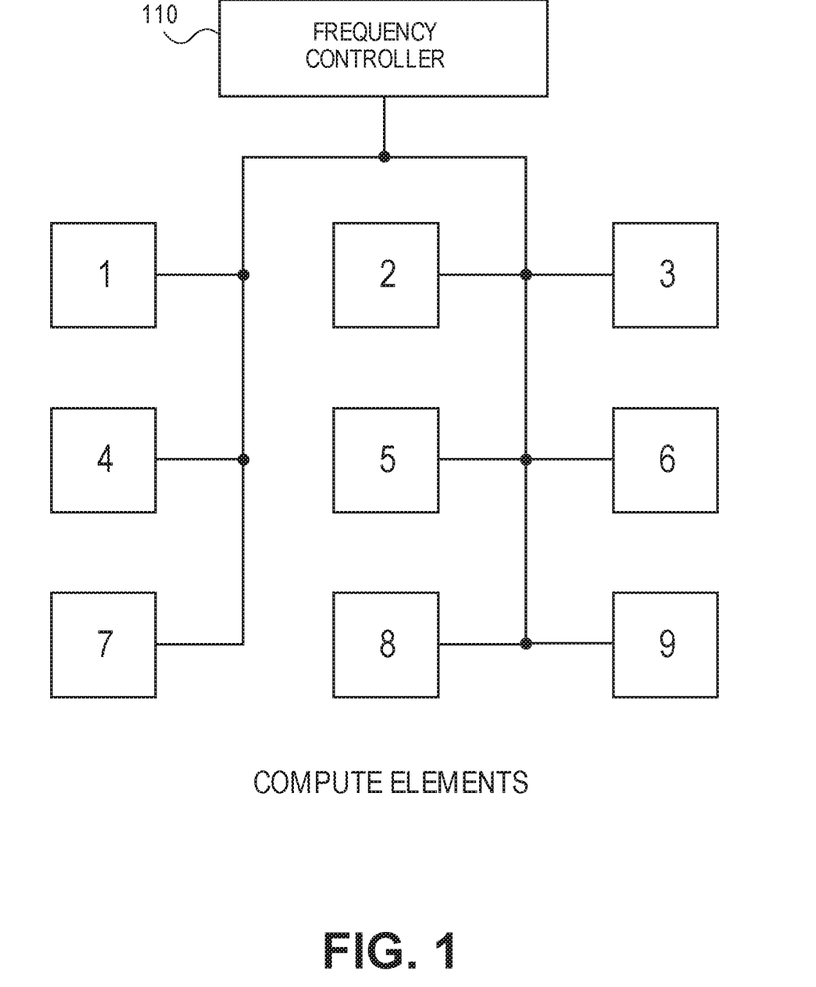
FIG. 1 shows a group of compute elements that make up a system, according to an embodiment of the invention.

FIG. 1 shows a group of compute elements that make up a system, according to an embodiment of the invention. In some embodiments, each compute element may be considered a separate core in a multi-core computer system. In other embodiments, each compute element may be a customized circuit with a specific purpose. Still other embodiments may take other forms. In some embodiments, some or all of the various compute elements may communicate with each other or be coupled to each other. In many embodiments, the clock frequency of each compute element may be independent of the clock frequency of other compute elements. Within this document, since power consumption is derived from clock frequency, the concept of power budget may be equated to frequency budget. For purposes of brevity, the term 'element' may be used interchangeably with 'compute element'.

The clock frequencies of each of the various elements may be controlled in various ways. In the example shown, each element may have its frequency controlled by frequency controller 110. In some embodiments, this may be accomplished by having the clock signal(s) provided by frequency controller 110, by sending indicator(s) of each element's frequency to that element, or by other means. In some embodiments, each element's frequency may be communicated to that element through normal communication channels. As with most digital logic, heat generation may increase with increasing clock frequency.

Figure 2:
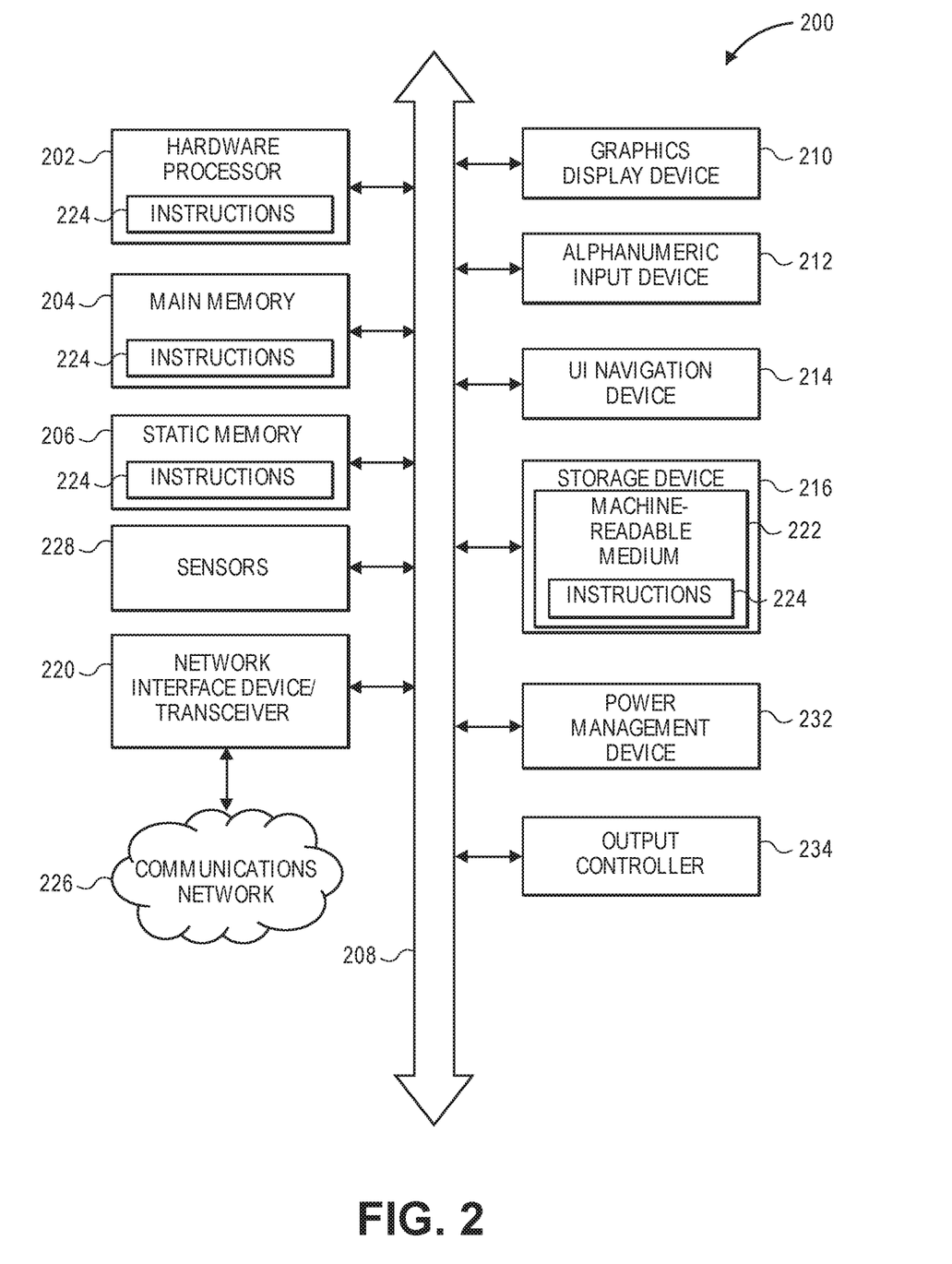
FIG. 2 shows a diagram of a computing device, according to an embodiment of the invention.

FIG. 2 shows a diagram of a computing device, according to an embodiment of the invention. Device 200 may include modules such as, but not limited to, processor 202, memories 204 and 206, sensors 228, network interface 220, graphics display device 210, alphanumeric input device 212 (such as a keyboard), user interface navigation device 214, storage device 216 containing a machine readable medium 222, power management device 232, and output controller 234. Instructions 224 may be executed to perform the various functions described in this document. The instructions are shown in multiple memories, though this is not a requirement. Communications network 226 may be a network external to the device, through which the device 200 may communicate with other devices. Multiple computer devices 200 may be part of a computer system. In some embodiments, some or all of the components of computer device 200 may be in a compute element.

In the following descriptions, these terms are defined:

N—the total number of elements across which power is being distributed.

i—one of elements 1 through N $f_i$—The minimum frequency that may be used for element i when a minimum performance level must be met.

$F_i$—The maximum desired frequency for element i. That is, any higher frequency may achieve performance for element i beyond the performance level desired. Cutting off at this frequency allows other, higher priority elements to use the additional available performance.

$w_i$—Weight. A unitless measure of the relative priority of the compute element i. In general, higher weights indicate higher priority.

$W_{max}$—The maximum weight that any compute element may be assigned.

$N_w$—The number of compute elements with a particular weight w.

bucket—a conceptual term indicating a group of all the elements that have been assigned the same weight w.

$b_w$—The combined frequency budget granted to all compute elements with weight w. Since power consumption and heat generation are the ultimate resources of concern, and both may be proportional to frequency, the term 'frequency budget' may be used in the same manner as 'power budget' or 'energy budget' in other descriptions.

B—the aggregate frequency budget granted to all compute elements combined in all buckets.

$A_w$—The 'aggregate frequency headroom' of weight w. That is, the collective frequency that all elements in a bucket can possibly utilize beyond the minimum requested frequency of every element in that bucket, before being clipped due to the maximum frequency $F_w$ of each element. In other words, $A_w$ may be equal to the sum of ($F_i$-$f_i$) for all the elements in that bucket. All this headroom might not be usable. It may be limited by the budget $b_w$ available to that bucket.

Pi—The performance (frequency) of compute element i that is output according to the algorithm.

Figure 3A:
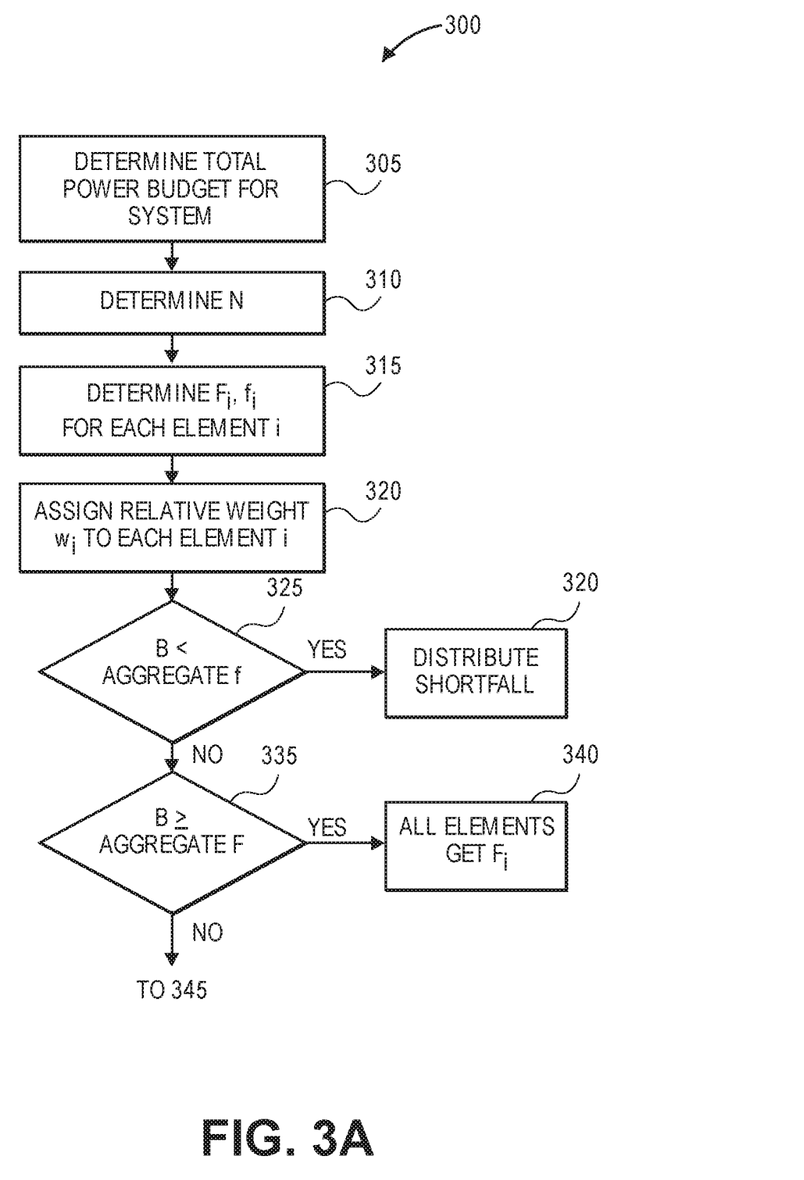
FIGS. 3A and 3B show a flow diagram of a method of distributing frequency to multiple compute elements, according to an embodiment of the invention.
Figure 3B:
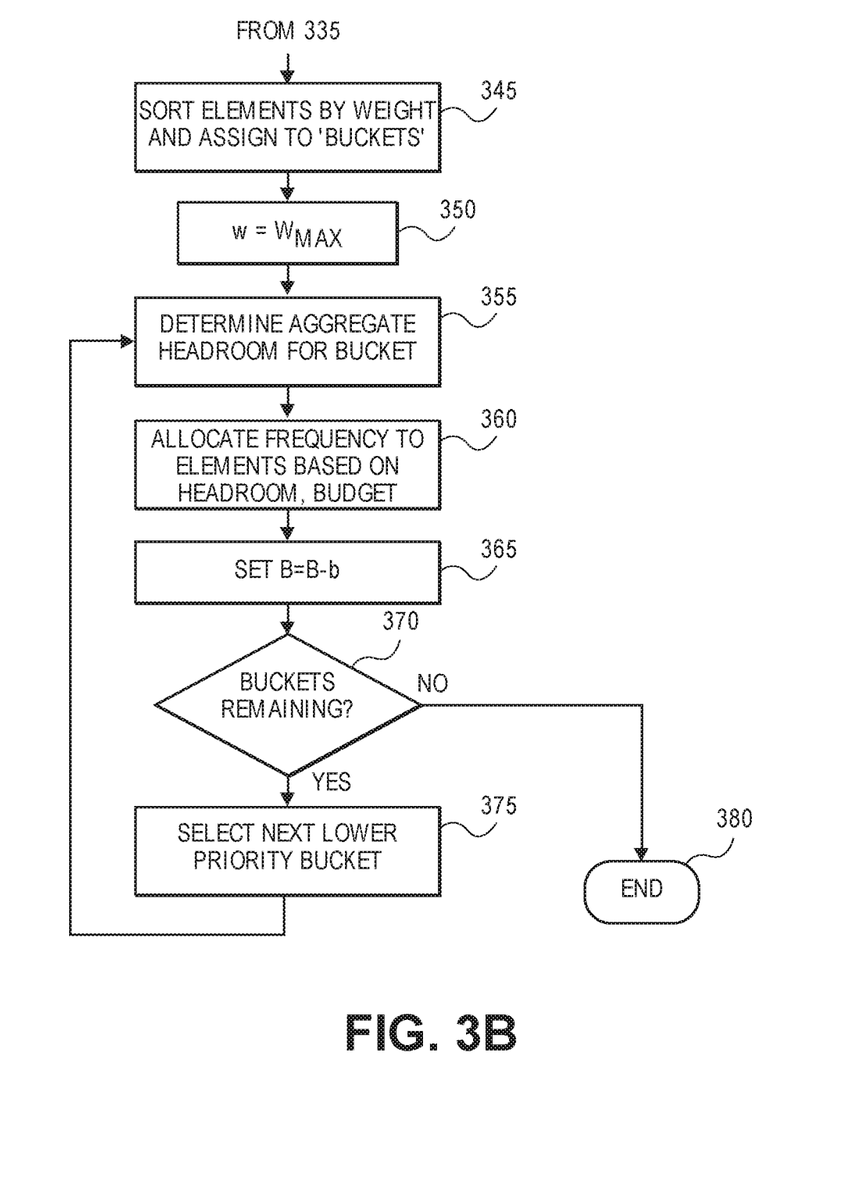

FIGS. 3A and 3B show a flow diagram of a method of distributing frequency to multiple compute elements, according to an embodiment of the invention. In flow diagram 300, at 305 the system may determine the total power budget for that system. In some embodiments this may be expressed as a frequency budget, since the power-saving operations of this system are based on controlling the frequencies. Other power saving techniques such as reduced voltage, fan-controlled air flow, etc., are ignored in this document. At 310, the system may be divided into N elements, where each element will have an independently-assignable operating frequency. In some embodiments, each element may be a processing core, but other embodiments may differ. For the purposes of this discussion, each element, and the other parameters associated with that element, may be indicated with the identifier i, with the values for i ranging from 1 to N. At 315, $F_i$ and $f_i$ may be determined for each element i.

At 320, a relative weight w may be assigned to each element i. Weight may be a measure of priority, or importance, and multiple elements may have the same weight. In some embodiments, weights of a higher value indicate a higher priority for the corresponding elements, while weights of a lower value indicate a lower priority for the corresponding elements. In some embodiments, the values assigned to the various weights may be proportional to their relative priorities (not just rank ordered). In other embodiments, proportionality may not matter. Although shown at a particular place in the flow, the assignment of weights to elements may occur earlier than shown. In FIGS. 3A and 3B, the values of weights $w_i$, and frequencies $f_i$ and $F_i$ are all shown at certain points in the flow. But in some embodiments, these values may be redefined at other times.

At 325, it may be determined if the total frequency budget B is sufficient to provide the minimum requested budget $f_i$ to every element i in the system. If there is insufficient power for this, the shortfall of available frequency may be distributed in various ways at 330. For example, in some embodiments the frequency shortage may be distributed in proportion to the minimum frequency request of each element. In other embodiments, some elements may be shut off completely and their intended frequency made available to the remaining elements. Other techniques may also be used. In any case, operation 330 indicates that some or all of the elements will not receive their requested minimum frequency $f_i$.

If B is sufficient to meet the minimum requested $f_i$ for all elements in the system, it may be determined at 335 if B is sufficient to meet the maximum requested $F_i$ for all elements in the system. If B meets or exceeds this amount, every element may be allocated its $F_i$ at 340 and any remaining frequency for all elements combined may go unused. But if B is sufficient to supply the aggregate of all $f_i$, while insufficient to supply the aggregate of all $F_i$, then the flow may proceed to 345 to determine how to distribute the available frequency budget among the various elements.

Continuing flow diagram 300 at 345 in FIG. 3B, the various elements may be sorted by the weights they were assigned at 320, and placed into groups (virtual 'buckets'), where every element in a bucket has the same weight. For discussion purposes, each bucket may now be referred to as 'bucket w', indicating a bucket with elements which all have weight w. After bucketizing the elements at 345, the flow may continue at 350 by setting w=$W_{MAX}$, which effectively selects the bucket containing the highest priority elements.

Within this bucket, the aggregate headroom for all the elements in the bucket may be determined at 355. In some embodiments, this may be determined by subtracting $f_i$ from $F_i$ for each element in the bucket, and summing the results for all the elements in that bucket. This sum represents aggregate headroom for this bucket, that is, the maximum amount of frequency that may be allocated among all the elements in this bucket based solely on $F_i$ and $f_i$. However, the budget $b_w$ may be smaller than that maximum amount and therefore limit that allocation of frequency. Therefore at 360, the frequency allocated to the elements of this bucket may be the lesser of 1) the budget $b_w$ assigned to this bucket, and 2) the aggregate headroom for this bucket. The budget $b_w$ assigned to this bucket may be determined is various ways, such as but not limited to scaling the total available budget B by the relative weight of bucket w to the weight of all buckets i<w (for example, $b_w$=B*$n_w$*w/(sum($n_i$*i)) for i<w. In some embodiments, the distribution of frequency among the elements in this bucket may be prorated based on the various parameters, such as but not limited to: 1) the relative values of $f_i$, 2) the relative values of $F_i$, or 3) the relative headroom for each element.

Once the allocated budget has been distributed to the elements in this bucket at 360, the remaining overall budget B for the system may be determined at 365. In some embodiments, this may be determined by subtracting the budget just allocated from the previous budget. At 370, if all buckets have been processed as described in operations 355-365, then the process may end at 380. But if not, the next lower priority bucket may be selected at 375, and the flow may return to 355 to distribute the frequency budget within that bucket. This may continue until all buckets have been processed, or until all frequency budget has been allocated.

EXAMPLES

The following examples pertain to particular embodiments:

Example 1 includes a frequency control device to control frequency allocation to multiple compute elements in a processing system, the device configured to: determine, for each element i, a minimum frequency $f_i$ at which the element will meet minimum performance levels; determine, for each element i, a maximum frequency $F_i$ at which the element will meet desired performance levels without exceeding the desired performance levels; determine an aggregate frequency budget for all elements combined; if the aggregate frequency budget is less than an aggregate of minimum frequencies for all elements combined, distribute less than each element's minimum frequency to each corresponding element; and if the aggregate frequency budget is greater than an aggregate of maximum frequencies for all elements combined, distribute each element's maximum frequency to each corresponding element.

Example 2 includes the frequency control device of example 1, wherein: if the frequency budget is greater than the aggregate of minimum frequencies for all elements combined and less than the aggregate of maximum frequencies for all elements combined, the device is further configured to sort all elements by priority, place elements with like priority in a group, and assign a group frequency budget to each group.

Example 3 includes the frequency control device of example 2, further configured to: select a highest priority group; distribute the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

Example 4 includes the frequency control device of example 3, wherein the predetermined portion of the assigned frequency budget is to be based on the relative minimum frequencies for all elements in the highest priority group.

Example 5 includes the frequency control device of example 3, further configured to determine a remaining aggregate frequency budget for all remaining elements after distributing frequencies to the elements in the highest priority group.

Example 6 the frequency control device of example 3, further configured to: select the second highest priority group; distribute the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

Example 7 includes the frequency control device of example 1, further comprising the multiple compute elements coupled to the device.

Example 8 includes a method of controlling frequency allocation to multiple compute elements in a processing system, the method comprising: determining, for each element i, a minimum frequency $f_i$ at which the element will meet minimum performance levels; determining, for each element i, a maximum frequency $F_i$ at which the element will meet desired performance levels without exceeding the desired performance levels; determining an aggregate frequency budget for all elements combined; if the aggregate frequency budget is less than an aggregate of minimum frequencies for all elements combined, distributing less than each element's minimum frequency to each corresponding element; and if the aggregate frequency budget is greater than an aggregate of maximum frequencies for all elements combined, distributing each element's maximum frequency to each corresponding element.

Example 9 includes the method of example 8, wherein: if the frequency budget is greater than the aggregate of minimum frequencies for all elements combined and less than the aggregate of maximum frequencies for all elements combined, sorting all elements by priority, placing elements with like priority in a group, and assigning a group frequency budget to each group.

Example 10 includes the method of example 9, further comprising: selecting a highest priority group; distributing the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

Example 11 includes the method of example 10, wherein the predetermined portion of the assigned frequency budget is based on the relative minimum frequencies for all elements in the highest priority group.

Example 12 includes the method of example 10, further comprising determining a remaining aggregate frequency budget for all remaining elements after distributing frequencies to the elements in the highest priority group.

Example 13 includes the method of example 10, further comprising: selecting the second highest priority group; distributing the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

Example 14 includes a computer-readable non-transitory storage medium that contains instructions, which when executed by one or more processors result in performing operations comprising: determining, for each element i in a processing system, a minimum frequency $f_i$ at which the element will meet minimum performance levels; determining, for each element i, a maximum frequency $F_i$ at which the element will meet desired performance levels without exceeding the desired performance levels; determining an aggregate frequency budget for all elements combined; if the aggregate frequency budget is less than an aggregate of minimum frequencies for all elements combined, distributing less than each element's minimum frequency to each corresponding element; and if the aggregate frequency budget is greater than an aggregate of maximum frequencies for all elements combined, distributing each element's maximum frequency to each corresponding element.

Example 15 includes the medium of example 14, wherein: if the frequency budget is greater than the aggregate of minimum frequencies for all elements combined and less than the aggregate of maximum frequencies for all elements combined, sorting all elements by priority, placing elements with like priority in a group, and assigning a group frequency budget to each group.

Example 16 includes the medium of example 14, further comprising: selecting a highest priority group; distributing the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

Example 17 includes the medium of example 16, wherein the predetermined portion of the assigned frequency budget is based on the relative minimum frequencies for all elements in the highest priority group.

Example 18 includes the medium of example 16, wherein the operations further comprise determining a remaining aggregate frequency budget for all remaining elements after distributing frequencies to the elements in the highest priority group.

Example 19 includes the medium of example 16, wherein the operations further comprise: selecting the second highest priority group; distributing the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

Example 20 includes a frequency control device to control frequency allocation to multiple compute elements in a processing system, the device having means to: determine, for each element i, a minimum frequency $f_i$ at which the element will meet minimum performance levels; determine, for each element i, a maximum frequency $F_i$ at which the element will meet desired performance levels without exceeding the desired performance levels; determine an aggregate frequency budget for all elements combined; if the aggregate frequency budget is less than an aggregate of minimum frequencies for all elements combined, distribute less than each element's minimum frequency to each corresponding element; and if the aggregate frequency budget is greater than an aggregate of maximum frequencies for all elements combined, distribute each element's maximum frequency to each corresponding element.

Example 21 includes the frequency control device of example 20, wherein: if the frequency budget is greater than the aggregate of minimum frequencies for all elements combined and less than the aggregate of maximum frequencies for all elements combined, the device is further configured to sort all elements by priority, place elements with like priority in a group, and assign a group frequency budget to each group.

Example 22 includes the frequency control device of example 21, the device further having means to: select a highest priority group; distribute the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

Example 23 includes the frequency control device of example 22, wherein the predetermined portion of the assigned frequency budget is to be based on the relative minimum frequencies for all elements in the highest priority group.

Example 24 includes the frequency control device of example 22, the device further having means to determine a remaining aggregate frequency budget for all remaining elements after distributing frequencies to the elements in the highest priority group.

Example 25 includes the frequency control device of example 22, the device further having means to: select the second highest priority group; distribute the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

Example 26 includes the frequency control device of example 20, further comprising means for the multiple compute elements coupled to the device.

The foregoing description is intended to be illustrative and not limiting. Variations will occur to those of skill in the art. Those variations are intended to be included in the various embodiments of the invention, which are limited only by the scope of the following claims.

What is claimed is:

1. A frequency control device to control frequency allocation to multiple compute elements in a processing system, the frequency control device configured to:
   determine, for each element i, a minimum frequency $f_i$ at which the element will meet minimum performance levels;

determine, for each element i, a maximum frequency $F_i$ at which the element will meet desired performance levels without exceeding the desired performance levels;
determine an aggregate frequency budget for all elements combined;
when the aggregate frequency budget is less than an aggregate of minimum frequencies for all elements combined, distribute less than each element's minimum frequency from the frequency control device to each corresponding element; and
when the aggregate frequency budget is greater than an aggregate of maximum frequencies for all elements combined, distribute each element's maximum frequency from the frequency control device to each corresponding element.

2. The frequency control device of claim 1, wherein:
when the aggregate frequency budget is greater than the aggregate of minimum frequencies for all elements combined and less than the aggregate of maximum frequencies for all elements combined, the device is further configured to sort all elements by priority, place elements with like priority in a group, and assign a group frequency budget to each group.

3. The frequency control device of claim 2, further configured to:
select a highest priority group; and
distribute the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

4. The frequency control device of claim 3, wherein the predetermined portion of the assigned frequency budget is to be based on the relative minimum frequencies for all elements in the highest priority group.

5. The frequency control device of claim 3, further configured to determine a remaining aggregate frequency budget for all remaining elements after distributing frequencies to the elements in the highest priority group.

6. The frequency control device of claim 3, further configured to:
select the second highest priority group; and
distribute the assigned frequency budget for the second highest priority group to the elements in the second highest priority group;
wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

7. The frequency control device of claim 1, further comprising
the multiple compute elements coupled to the device.

8. A method of controlling frequency allocation from a frequency control device to multiple compute elements in a processing system, the method comprising:
determining, for each element i, a minimum frequency $f_i$ at which the element will meet minimum performance levels;
determining, for each element i, a maximum frequency $F_i$ at which the element will meet desired performance levels without exceeding the desired performance levels;
determining an aggregate frequency budget for all elements combined;
when the aggregate frequency budget is less than an aggregate of minimum frequencies for all elements combined, distributing less than each element's minimum frequency from the frequency control device to each corresponding element; and
when the aggregate frequency budget is greater than an aggregate of maximum frequencies for all elements combined, distributing each element's maximum frequency from the frequency control device to each corresponding element.

9. The method of claim 8, wherein:
when the aggregate frequency budget is greater than the aggregate of minimum frequencies for all elements combined and less than the aggregate of maximum frequencies for all elements combined, sorting all elements by priority, placing elements with like priority in a group, and assigning a group frequency budget to each group.

10. The method of claim 9, further comprising:
selecting a highest priority group; and
distributing the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

11. The method of claim 10, wherein the predetermined portion of the assigned frequency budget is based on the relative minimum frequencies for all elements in the highest priority group.

12. The method of claim 10, further comprising
determining a remaining aggregate frequency budget for all remaining elements after distributing frequencies to the elements in the highest priority group.

13. The method of claim 10, further comprising:
selecting the second highest priority group; and
distributing the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

14. A computer-readable, non-transitory storage medium that contains instructions that, when executed by one or more processors, result in performing operations comprising:
determining, for each element i in a processing system, a minimum frequency $f_i$ at which the element will meet minimum performance levels;

determining, for each element i, a maximum frequency $F_i$ at which the element will meet desired performance levels without exceeding the desired performance levels;

determining an aggregate frequency budget for all elements combined;

when the aggregate frequency budget is less than an aggregate of minimum frequencies for all elements combined, distributing less than each element's minimum frequency from a frequency control device to each corresponding element; and when the aggregate frequency budget is greater than an aggregate of maximum frequencies for all elements combined, distributing each element's maximum frequency from the frequency control device to each corresponding element.

15. The medium of claim 14, wherein:

when the aggregate frequency budget is greater than the aggregate of minimum frequencies for all elements combined and less than the aggregate of maximum frequencies for all elements combined, sorting all elements by priority, placing elements with like priority in a group, and assigning a group frequency budget to each group.

16. The medium of claim 14, the operations further comprising:

selecting a highest priority group; and distributing the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

17. The medium of claim 16, wherein the predetermined portion of the assigned frequency budget is based on relative minimum frequencies for all elements in the highest priority group.

18. The medium of claim 16, wherein the operations further comprise determining a remaining aggregate frequency budget for all remaining elements after distributing frequencies to the elements in the highest priority group.

19. The medium of claim 16, wherein the operations further comprise:

selecting the second highest priority group; and distributing the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

20. A frequency control device to control frequency allocation to multiple compute elements in a processing system, the frequency control device having means to:

determine, for each element i, a minimum frequency $f_i$ at which the element will meet minimum performance levels;

determine, for each element i, a maximum frequency $F_i$ at which the element will meet desired performance levels without exceeding the desired performance levels;

determine an aggregate frequency budget for all elements combined;

when the aggregate frequency budget is less than an aggregate of minimum frequencies for all elements combined, distribute less than each element's minimum frequency from the frequency control device to each corresponding element; and when the aggregate frequency budget is greater than an aggregate of maximum frequencies for all elements combined, distribute each element's maximum frequency from the frequency control device to each corresponding element.

21. The frequency control device of claim 20, wherein:

when the aggregate frequency budget is greater than the aggregate of minimum frequencies for all elements combined and less than the aggregate of maximum frequencies for all elements combined, the device is further configured to sort all elements by priority, place elements with like priority in a group, and assign a group frequency budget to each group.

22. The frequency control device of claim 21, the device further having means to:

select a highest priority group; and distribute the assigned frequency budget for the highest priority group to the elements in the highest priority group; wherein said distributing the assigned frequency budget for the highest priority group includes allocating, to each element in the highest priority group, a frequency that is greater than or equal to the minimum frequency for that element and is less than or equal to the lesser of the maximum frequency for that element and a predetermined portion of the assigned frequency budget for the highest priority group.

23. The frequency control device of claim 22, wherein the predetermined portion of the assigned frequency budget is to be based on the relative minimum frequencies for all elements in the highest priority group.

24. The frequency control device of claim 22, the device further having means to determine a remaining aggregate frequency budget for all remaining elements after distributing frequencies to the elements in the highest priority group.

25. The frequency control device of claim 22, the device further having means to:

select the second highest priority group; and distribute the assigned frequency budget for the second highest priority group to the elements in the second highest priority group; wherein said distributing the assigned frequency budget for the second highest priority group includes allocating, to each element in the second highest priority group, a frequency that is greater than or equal to the minimum frequency for that element and is less than or equal to the lesser of the maximum frequency for that element and a predetermined portion of the assigned frequency budget for the second highest priority group.

\* \* \* \* \*

UNITED STATES PATENT AND TRADEMARK OFFICE
CERTIFICATE OF CORRECTION

PATENT NO.          : 10,627,885 B2
APPLICATION NO.     : 15/866425
DATED               : April 21, 2020
INVENTOR(S)         : Asma Al-Rawi et al.

It is certified that error appears in the above-identified patent and that said Letters Patent is hereby corrected as shown below:

In the Claims

Column 9, Line 39, in Claim 4, after "on" delete "the", therefor.

Column 10, Line 40, in Claim 11, after "on" delete "the", therefor.

Column 12, Line 44, in Claim 23, after "on" delete "the", therefor.

Signed and Sealed this
Ninth Day of June, 2020

Andrei Iancu
*Director of the United States Patent and Trademark Office*